(12) United States Patent
Xia et al.

(10) Patent No.: US 9,048,995 B2
(45) Date of Patent: Jun. 2, 2015

(54) METHOD AND SYSTEM FOR LOW LATENCY RADIO FREQUENCY WAVE TRANSMISSION

(75) Inventors: Tiejun J. Xia, Richardson, TX (US); Glenn A. Wellbrock, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 674 days.

(21) Appl. No.: 13/298,965

(22) Filed: Nov. 17, 2011

(65) Prior Publication Data

US 2013/0129005 A1    May 23, 2013

(51) Int. Cl.
| | |
|---|---|
| H04J 3/02 | (2006.01) |
| H04L 1/00 | (2006.01) |
| H04N 21/2368 | (2011.01) |
| H04L 12/851 | (2013.01) |
| H04L 12/805 | (2013.01) |
| H04L 12/875 | (2013.01) |
| H04W 72/12 | (2009.01) |

(52) U.S. Cl.
CPC ............ *H04L 1/007* (2013.01); *H04N 21/2368* (2013.01); *H04L 47/2441* (2013.01); *H04L 47/365* (2013.01); *H04L 47/56* (2013.01); *H04W 72/1242* (2013.01); *H04L 1/0089* (2013.01)

(58) Field of Classification Search
USPC .................... 370/329–337; 375/219, 295, 316
See application file for complete search history.

(56) References Cited

U.S. PATENT DOCUMENTS

| | | | |
|---|---|---|---|
| 7,596,123 B2 * | 9/2009 | Periyalwar et al. ........... 370/337 |
| 8,023,530 B1 * | 9/2011 | Giallorenzi et al. .......... 370/469 |
| 2008/0056192 A1 * | 3/2008 | Strong et al. .................. 370/331 |
| 2009/0252102 A1 * | 10/2009 | Seidel et al. .................. 370/329 |
| 2011/0116532 A1 * | 5/2011 | Nentwig ........................ 375/219 |

* cited by examiner

*Primary Examiner* — Vinncelas Louis

(57) ABSTRACT

An approach is provided for low latency radio frequency wave transmission. A long haul transport network receives a first signal representing latency sensitive data, receives a second signal representing latency insensitive data, and combines the first signal and the second signal to output a combined radio frequency signal, wherein the latency sensitive data of the combined radio frequency signal are at a first level of error coding, and the latency insensitive data of the combined radio frequency signal are at a second level of error coding.

18 Claims, 13 Drawing Sheets

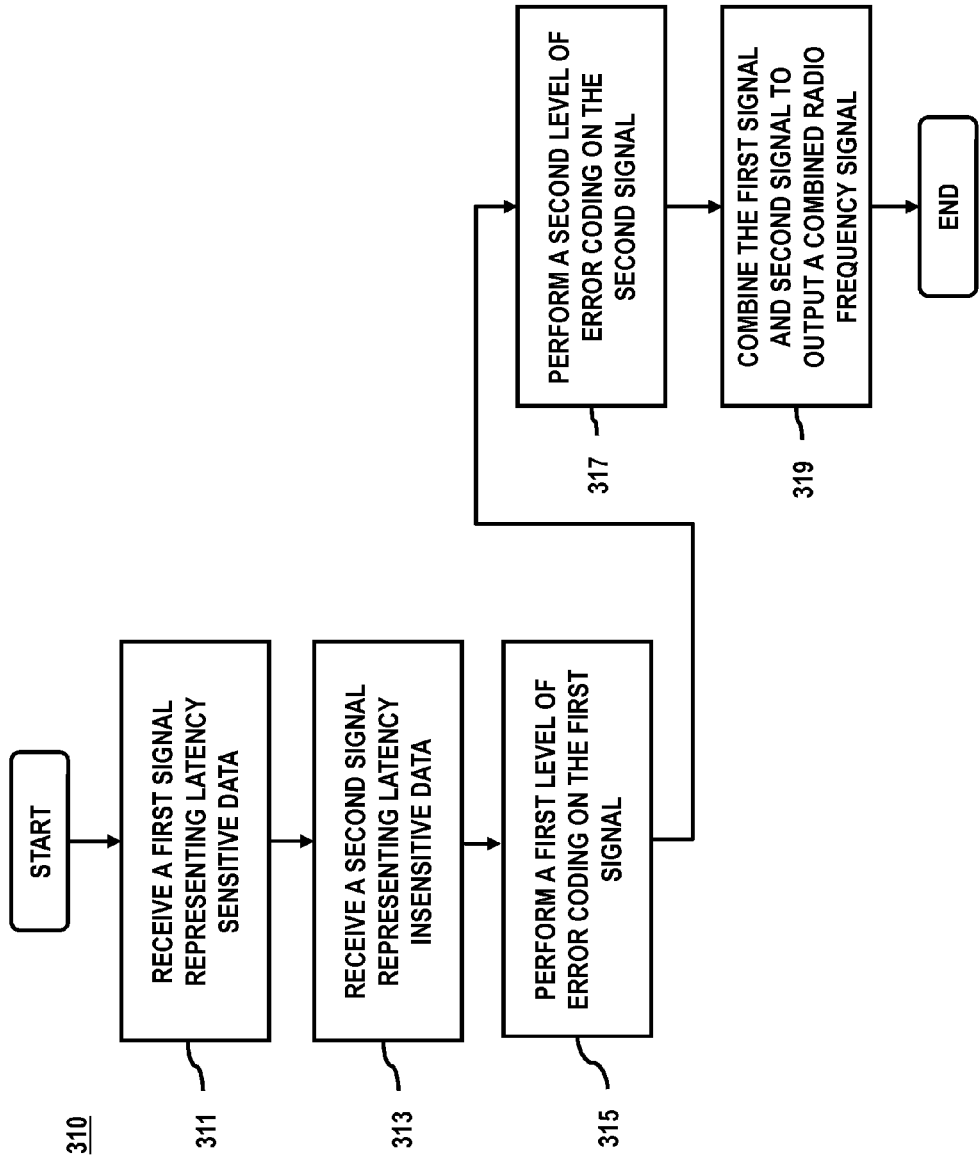

US 9,048,995 B2

METHOD AND SYSTEM FOR LOW LATENCY RADIO FREQUENCY WAVE TRANSMISSION

BACKGROUND INFORMATION

Providers of communication networks are continually challenged to deliver fast and reliable data transfers to consumers by advancing underlying technologies. One area of interest has been the development of services and technologies relating to transmission latency. For example, in recent years, the telecommunications industry has built new routes merely to reduce network latency. Traditional approaches often times involve radio frequency (RF) wave transmissions with overhead, such as error coding, to maintain signal integrity. Such overhead information requires additional processing, and thus, increases latency.

Therefore, there is a need for an effective approach for reducing transmission latency by manipulating transmission overhead.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A and 3B are flowcharts of a process for low latency radio frequency wave transmission, according to exemplary embodiments;

DESCRIPTION OF THE PREFERRED EMBODIMENT

An apparatus, method, and system for low latency radio frequency wave transmission are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
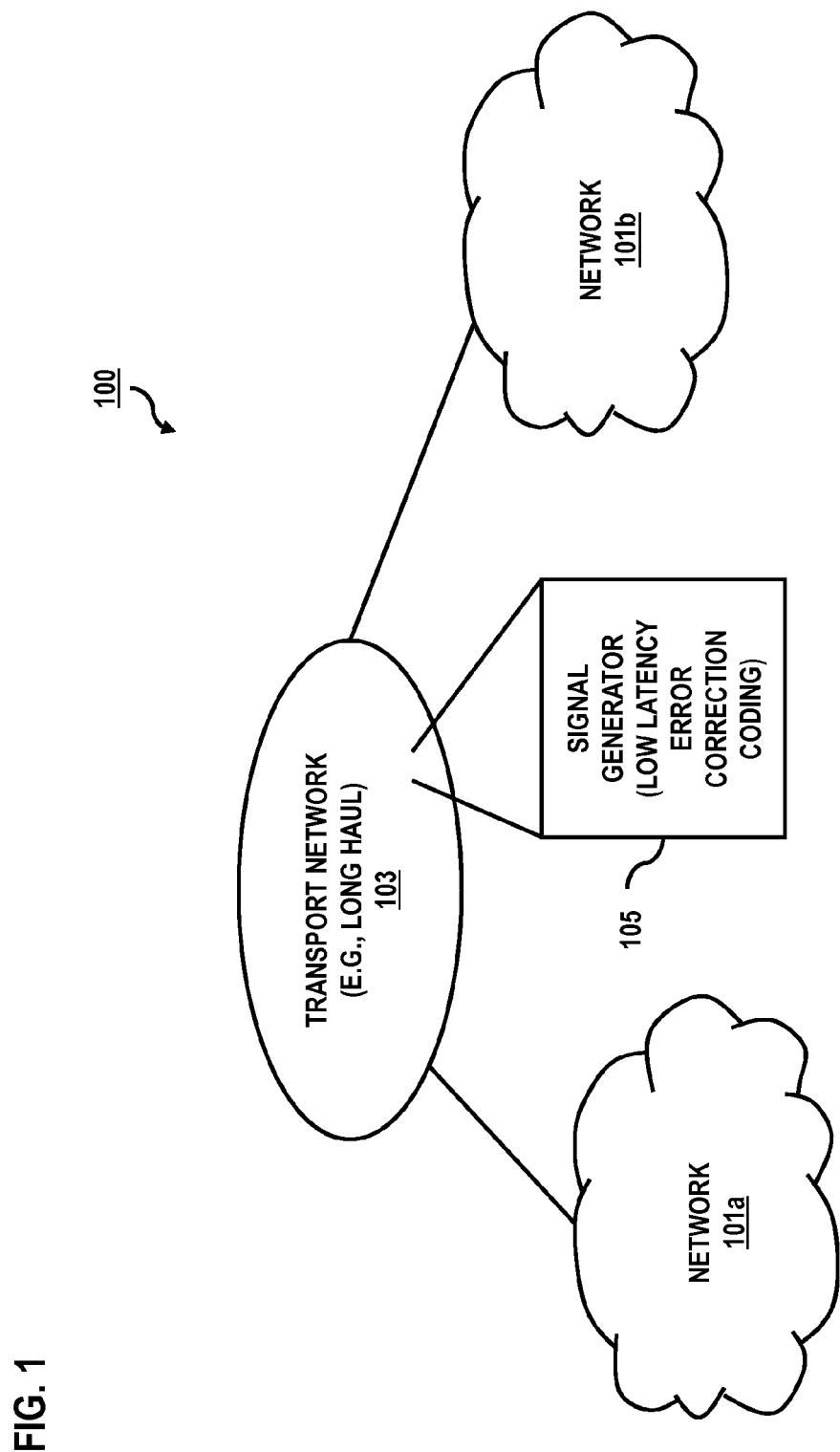
FIG. 1 is a diagram of a system capable of low latency radio frequency wave transmission, according to an exemplary embodiment.

FIG. 1 is a diagram of a system capable of low latency radio frequency wave transmission, according to an exemplary embodiment. For the purpose of illustration, the system 100 includes a network 101a, a network 101b, and a transport network (e.g., long haul transport network) 103 to carry traffic between network 101a to network 101b. The transport network 103 can be configured to transport data over large distances from one network (e.g., network 101a) to another network (e.g., network 101b), and thus, be denoted as a long haul transport network. The transport network 103, in certain embodiments, utilizes radio frequency (RF) technology to send data from one point to another. By way of example, one or more signal generators 105 are utilized and are configured, for example, to enable low latency radio frequency wave transmission, in part, by selectively omitting certain transmission overhead—e.g., low latency error correction coding is employed. According to certain embodiments, low latency error correction coding involves utilizing no or reduced error correction schemes to reduce latency, and can be utilized for particular traffic that is sensitive to latency. In this example, because the network 103 spans large distances, the signal generator 105 may be deployed as a repeater (or regenerator) as well as transmitters.

As mentioned, the use of radio frequency waves to transfer data has enabled data networks to deliver fast and reliable data transfers. Numerous applications exist that require latency to be minimized. For example, financial firms have begun trading based on algorithms that process market updates and turn around orders within milliseconds. As such, millisecond improvements in network speeds offer significant competitive advantages to these firms. Unfortunately, traditional long distance data transmission using radio frequency waves can accumulate high latency from performing error coding. Error coding is necessary to minimize communication errors that result from the use of high frequency and high modulation level. Furthermore, government regulations require data transmissions using radio frequency waves to maintain a minimum spectral efficiency.

To address the issues, system 100 of FIG. 1 introduces the capability to reduce latency by use of differing levels of error coding (including no error correction coding at all) on latency sensitive data, while maintaining signal integrity and spectral efficiency. By way of example, long distance data transmission users can benefit from transport network 103, whereby latency is reduced during signal regeneration by decreasing the level of error coding (e.g., signal generator 105) and by separate treatment of latency sensitive data. For instance, error coding may be performed during some signal regeneration nodes, but not performed at other regeneration node. That is, the transport network 103 enables reduced latency by removing the amount of error coding performed during the transmission. Furthermore, signal integrity in the transmission may be maintained by separate treatment of latency sensitive data. That is, the transport network 103 separates latency sensitive data to enable improved signal integrity by using a signal with a reduced frequency and level of modulation. Additionally, the separated latency sensitive data may be combined with latency insensitive data to provide high spectral efficiency.

By way of example, each of the networks 101 may include any suitable wireline and/or wireless network. Network 101a may include, for example one or more of the following systems: a wireless network, a telephony network, a service provider network, and a data network. For example, network 101a may include a telephony network that includes a circuit-switched network, such as the public switched telephone network (PSTN), an integrated services digital network (ISDN), a private branch exchange (PBX), or other like network. Additionally, or alternatively, network 101a may include a wireless network employing various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. In yet another example, network 101 may include a data network such as, for example, any local area network (LAN), metropolitan area network (MAN), wide area network (WAN), the Internet, or any other suitable packet-switched network, such as a commercially owned, proprietary packet-switched network, such as a proprietary cable or fiber-optic network. It is noted that network 101b may also include anyone or more of the above networks. While specific reference will be made hereto, it is contemplated that system 100 may embody many forms and include multiple and/or alternative components and facilities.

Figure 2:
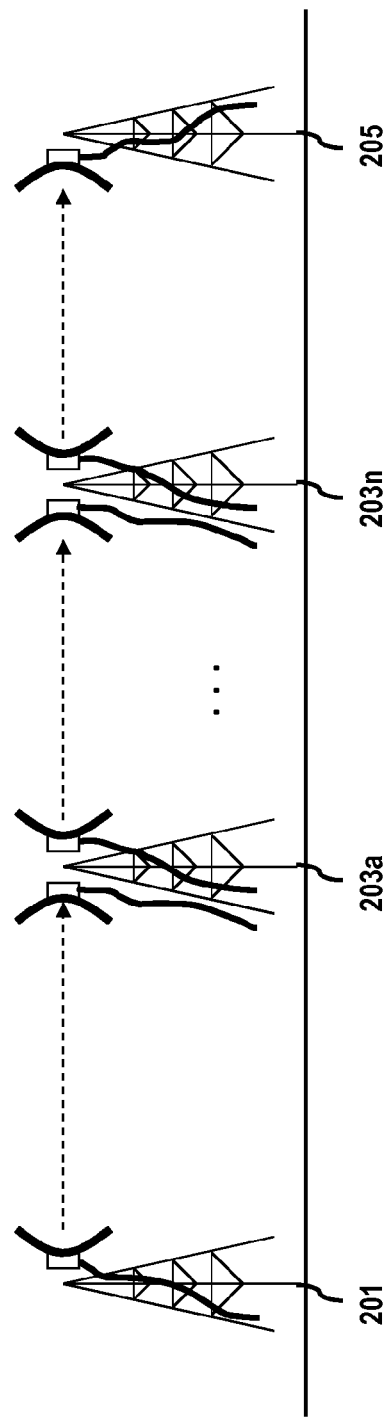
FIG. 2 is a diagram of a long haul transport network that can be deployed in the system of FIG. 1, according to an exemplary embodiment.

FIG. 2 is a diagram of a long haul transport network that can be deployed in the system of FIG. 1, according to an exemplary embodiment. Transport network 103 may comprise one or more components configured to execute the processes described herein (e.g., processes of FIGS. 3A and 3B) for providing the low latency data transmission of system 100. In one embodiment, transport network 103 includes a terminal transmitter 201, one or more signal regenerators (e.g., signal regenerator 203), and terminal receiver 205. While specific reference will be made to this particular embodiment, it is also contemplated that transport network 103 may embody many forms and include multiple and/or alternative components. For example, it is contemplated that the components of transport network 103 may be combined, located in separate structures, or separate locations.

As seen in FIG. 2, the transport network 103 may include a terminal transmitter 201 for receiving data and generating signals. For example, the terminal transmitter 201 may process latency sensitive data to generate a corresponding low frequency signal. The latency insensitive data can be represented by a high frequency signal. The low frequency signal is then combined with the high frequency signal for transmission to the next node 203a. It is contemplated that the modulation of the signals may be by various means; for example, m-mary (e.g., quadrature) amplitude modulation (QAM) for the high frequency signal, and 50% binary amplitude modulation for the low frequency signal. Other higher order modulation schemes may be utilized for the latency insensitive data; e.g., quadrature phase shift keying (QPSK), etc.

According to one embodiment, transport network 103 may include one or more signal regenerators 203 for increasing the signal intensity and error coding. For example, the signal regenerator 203a may receive the signal from the terminal transmitter 201 and fully regenerate the received signal for transmission—e.g., separate a low frequency signal and a high frequency signal, increase the signal intensity, error detect and/or correct the separated signals, recombine, modulate and transmit the signals. It is noted that the level of error coding may be different for each of the separated signals. Additionally, or alternatively, the error correction may not be performed for a separated signal. Furthermore, the signal regenerator 203 may be combined with one or more other signal regenerator 203 to facilitate long haul data transport.

According to exemplary embodiments, transport network 103 may also include a terminal receiver 205 for receiving a signal. For example, the terminal receiver 205 may receive the signal from, for example, a signal regenerator 203, separate low high frequency and high frequency signals, detect the separated signals, and process the data of each detected separated signals.

Figure 3A:
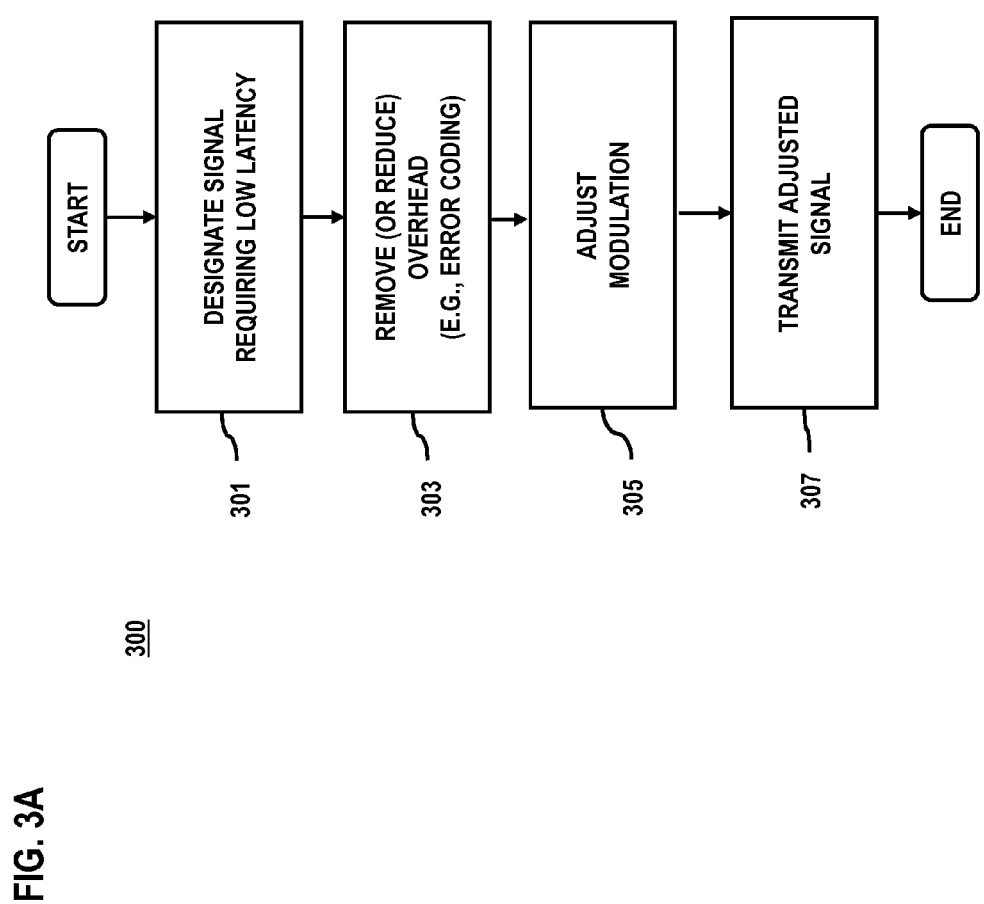

FIG. 3A is a flowchart of a process for low latency radio frequency wave transmission, according to an exemplary embodiment. For illustrative purpose, process 300 is described with respect to the systems of FIGS. 1 and 2. It is noted that the steps of process 300 may be performed in any suitable order, as well as combined or separated in any suitable manner. By way of example, such process 300 is performed by transport network 103. It is noted that various steps of transporting data increase latency, for example, queuing delay, processing delay, and transmission delay. Queuing delay may involve the delay when a node receives multiple packets and the node waits to receive packets before sending. Processing delay may stem from a node performing the following actions: error detecting, error correcting, data encryption, or modifies packet content. Additionally, delay may be added by increasing the number of nodes used in transporting the data and by increasing the distance the data is transported. These latency issues are mitigated by process 300.

In step 301, the process 300 receives latency sensitive and insensitive data from one network (e.g., network 101a) to be transported to another network (e.g., network 101b); in this manner, process 300 designates the signal that represents the latency sensitive data as requiring low latency transmission. According to one embodiment, the terminal transmitter 201 receives the latency sensitive data with an identifier from the sending or source network 101a that designates the data as latency sensitive. In another embodiment, the transport network 103 may designate the signal by receiving latency parameters from the sender of the data and determining whether the latency parameters require treating the signal as requiring low latency. Additionally, information relating to quality of service (QoS), class of service (CoS), and/or service level agreement (SLA) for the networks 101a and 101b can be obtained to assist with this designation.

Data may be received from the respective networks 101 by transport network 103 may be provided in various formats according to the associated technologies and protocols. It is contemplated the transport network 103 may receive data using methodology utilizing, for example, a circuit-switched network, wireless network technologies (e.g., CDMA, EDGE, GPRS, MANET, GSM, IMS, UMTS, WiMAX, WiFi), data network technologies (e.g., LAN, MAN, WAN), the Internet, or any other suitable packet-switched network (e.g, cable or fiber-optic network).

In step 303, process 300 can determine to remove (or reduce) the overhead for signals that are latency sensitive by not utilizing error coding at all or reducing the level of error coding (with respect to the latency insensitive data). To compensate for the reduced or removed error coding, process 300 adjusts the modulation performed on the latency sensitive data accordingly (per step 305). This reduction or elimination of error coding is more fully described with respect to FIG. 3B. In certain embodiments, the modulation level (and/or modulation frequency) can be appropriately reduced. This modified or adjusted signal is then transmitted, as in step 307.

In the context of the example of FIG. 2, transmitter 201 can send the adjusted signal to the next node, e.g., repeater or signal regenerator 203a.

FIG. 3B illustrates a process for achieving low latency radio frequency wave transmission through reducing error coding levels, according to an exemplary embodiment. Under this scenario, it is assumed that data is classified in advance of this process 310 into the following categories: latency sensitive or latency insensitive. As discussed, such classification can be performed based on various parameters, e.g., QoS, CoS, SLA, etc. It is contemplated that multiple levels of latency sensitivity or tolerances can also be developed, other than the 2 states of sensitive or insensitive.

In step 311, process 310, which can be implemented by node 201 and/or anyone of nodes 203a-203n, receives a first signal representing latency sensitive data from network 101a to be transported to destination network 101b. According to one embodiment, the terminal transmitter 201 receives the latency sensitive data with an identifier from the sending network 101b; such identifier designates the data as latency sensitive. In another embodiment, the transport network 103 may designate the signal using received latency parameters (or parameters whereby classification of latency service can be determined) from the sender or source of the data. Data that has been designated or otherwise classified as latency sensitive is transmitted using this first signal representing latency sensitive data.

In effect, the first signal representing latency sensitive data is segregated from data that has been designated as latency insensitive (which is represented by a second signal). The second signal is received, per step 313. In one embodiment, the frequency of the first signal is lower than the second signal. In another embodiment, the level of modulation of the first signal is lower than the second signal. In yet another embodiment, the level of data processing on the first signal is lower than the second signal.

In one embodiment, the high frequency high latency signal can be modulated using a high order modulation scheme—e.g., 64-QAM (Quadrature Amplitude Modulation) with a data rate of 180 Mb/s, symbol rate of 30 MBaud, and a signal bandwidth of 30 MHz. The low frequency low latency signal can be modulated using 50% binary amplitude modulation with a data rate of 1 Mb/s, symbol rate of 1 MBaud, and a signal bandwidth of 1 MHz. In this manner, spectral efficiency of the single radio frequency channel may be maintained, for example between 4 to 8 bit/s/Hz.

Given that the two different signals (corresponding to different sensitivities to latency), process 310 can configure the error coding for differing levels (along with the corresponding modulation level and frequency level). In step 315, process 310 performs error coding on the first signal representing latency sensitive data using a first level of error coding. According to one embodiment, this first level can be set to not use error coding at all (e.g., level="0"). That is, no error detection or correction scheme is utilized. Alternatively, the first level of error coding can include a low overhead scheme of error coding. In step 317, the second signal is encoding using a second level of error coding (e.g., level="1."). The second level of error coding on the second signal may include any type of error detecting and/or error correcting code—e.g., a forward error correcting code. It is contemplated that error coding may be performed at each node (e.g., signal regenerator 203) or less than all (e.g., one-half) the nodes.

The levels and associated error coding scheme can be determined based on the particular applications. The disparity in coding levels impacts the latency; also, the greater the disparity, the greater the difference in latency.

As earlier noted, error coding may include error detection and/or correction techniques, whereby data can be provided with overhead to enable successful delivery over communication channels that are subject to channel noise and other factors, e.g., attenuation. Error detection may include, for example, repetition codes, parity bits, checksums, cyclic redundancy checks, cryptographic hash functions, error-correcting codes. Error correction may include, for example, automatic repeat request, error-correcting code (e.g., Hamming codes), and hybrid schemes.

In step 319, the first and second signals are combined to output a combined radio frequency signal. Therefore, under this approach, the combination of low latency and high latency schemes enables a single channel to transmit low latency signals, while maintaining spectral efficiency of the radio frequency channel.

Figure 4:
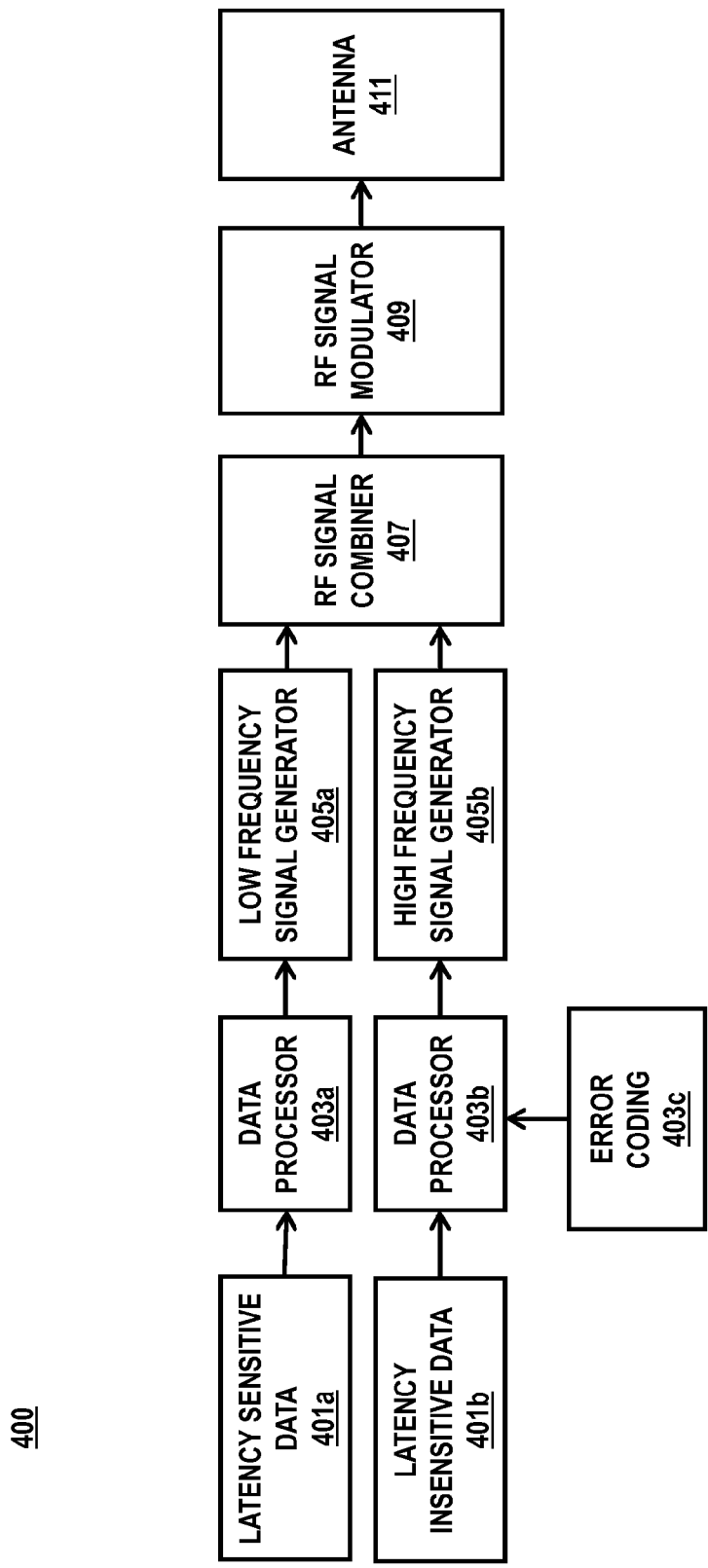
FIG. 4 is a diagram of transmitter chain, according to an exemplary embodiment.

FIG. 4 is a diagram of transmitter chain, according to an exemplary embodiment. In one embodiment, transmitter 400 includes one or more buffers 401a, 401b for receiving latency sensitive data and latency insensitive data, respectively. The latency sensitive data are fed to data processor 403a, while the latency insensitive data is supplied to data processor 403b. The determination of whether data is latency sensitive or insensitive may be performed within the network of the source of the traffic or within the transport network. Each of the data processors 403a and 403b prepares the data depending on the particular application. The data processing may include, for example, data encryption, packet modification, data conversion, etc.

In this example, data processor 403b, which handles the latency insensitive data, utilizes error coding applied by error coding module 403c. In an alternative embodiment, data processor 403a may utilize a different error coding module (not shown) that applies a different level of error coding (e.g., a lower or reduced level as to minimize latency). Also, it is contemplated that a single error coding module can be configured to generate different levels (and/or type) of error coding depending on the data type. However, in this exemplary embodiment of FIG. 4, no error coding is employed, and thus, error coding module 403c is shown coupled to the data processor 403b for the latency insensitive data.

The transmitter chain 400 further includes separate signal generators 405a and 405g for each type of data. Specifically, the low frequency signal generator 405a receives the latency sensitive data 403a processed by the data processor 403a to generate a low frequency signal. In one embodiment, the low frequency signal generator 405a is configured to enable a low latency transmission by reducing the symbol rate (e.g., 1 MBaud), and modulation level (e.g., 50% binary amplitude modulation). The high frequency signal generator 405b receives the latency insensitive data 401b that has been processed by the data processor 403b to generate a high frequency signal. In one embodiment, the high frequency signal generator 405b is configured to enable low latency transmission by increasing the symbol rate (e.g., 30 MBaud) and modulation level (e.g., 64-QAM) to improve the spectral efficiency of the radio frequency wave transmission (e.g., 6 bits/s/Hz). For example, the low frequency signal may have a signal bandwidth of 1 MHz, and the high frequency signal may have a signal bandwidth of 30 MHz.

Next in the transmitter chain is an RF signal combiner 407 followed by an RF signal modulator 409 and an antenna 411 to emit the modulated signal. The RF signal modulator 409 uses the signals combined by the radio frequency signal combiner 407 as a modulating signal to vary properties of a carrier signal.

While specific reference will be made to this particular implementation, it is also contemplated that terminal transmitter 400 may embody many forms and include multiple and/or alternative components.

Figure 5:
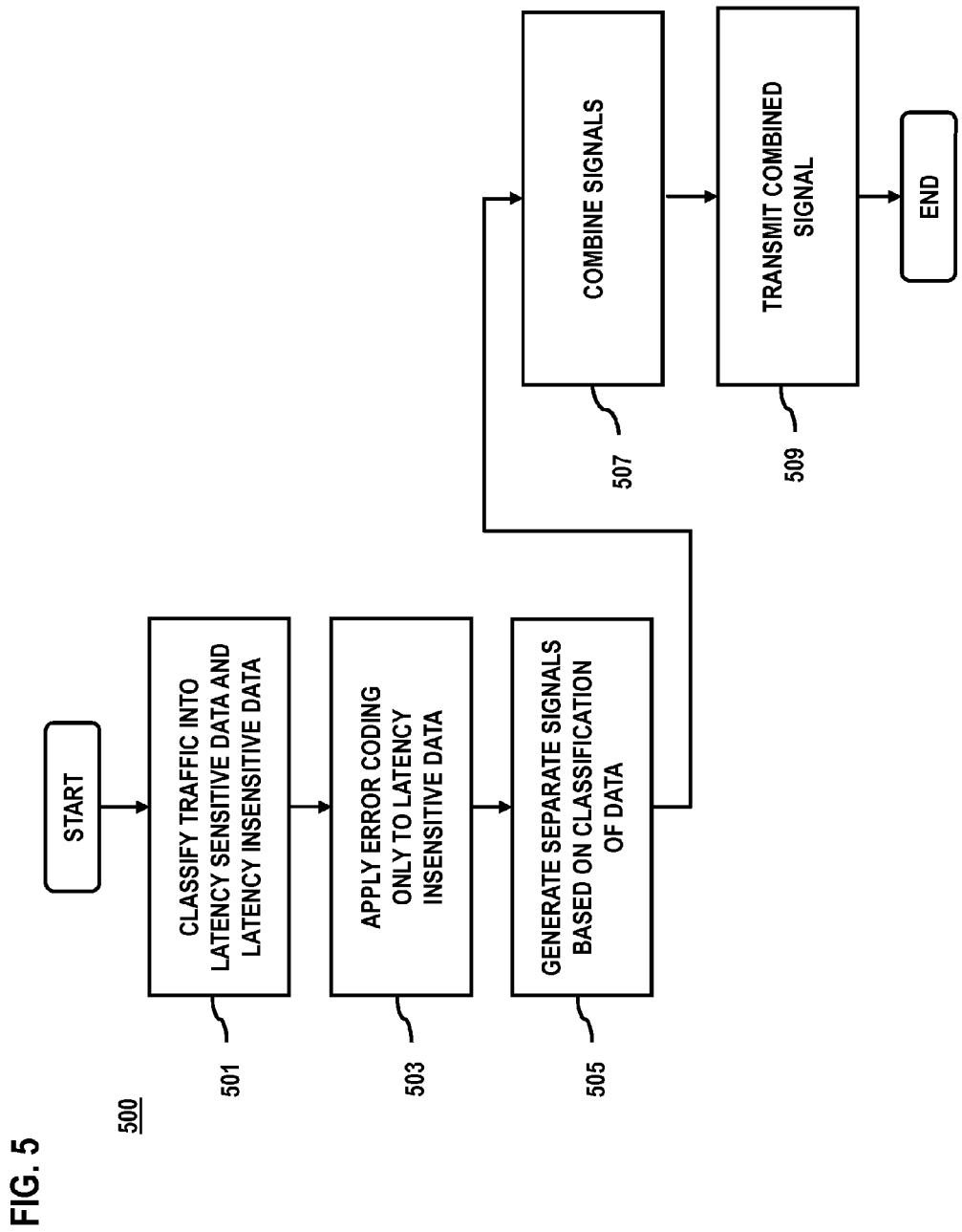
FIG. 5 is a flowchart of a process for transmitting signals in a low latency radio frequency wave transmission system, according to an exemplary embodiment.

FIG. 5 is a flowchart of a process for transmitting signals in a low latency radio frequency wave transmission system, according to an exemplary embodiment. For illustrative purpose, the process 500 is described with respect to signal generator 105 of FIG. 1. It is noted that the steps of the process may be performed in any suitable order, as well as combined or separated in any suitable manner. In this example, signal generator 105 can be configured with traffic classification logic to determine whether certain data should be classified as latency sensitive data, as in step 501. As explained, latency sensitive data can be exempted from any error coding. Thus, error coding is performed only on the latency insensitive data (step 503). In step 505, process 500 generates separate RF signals based on the classification. These signals are then combined and transmitted, per steps 507 and 509.

Figure 6:
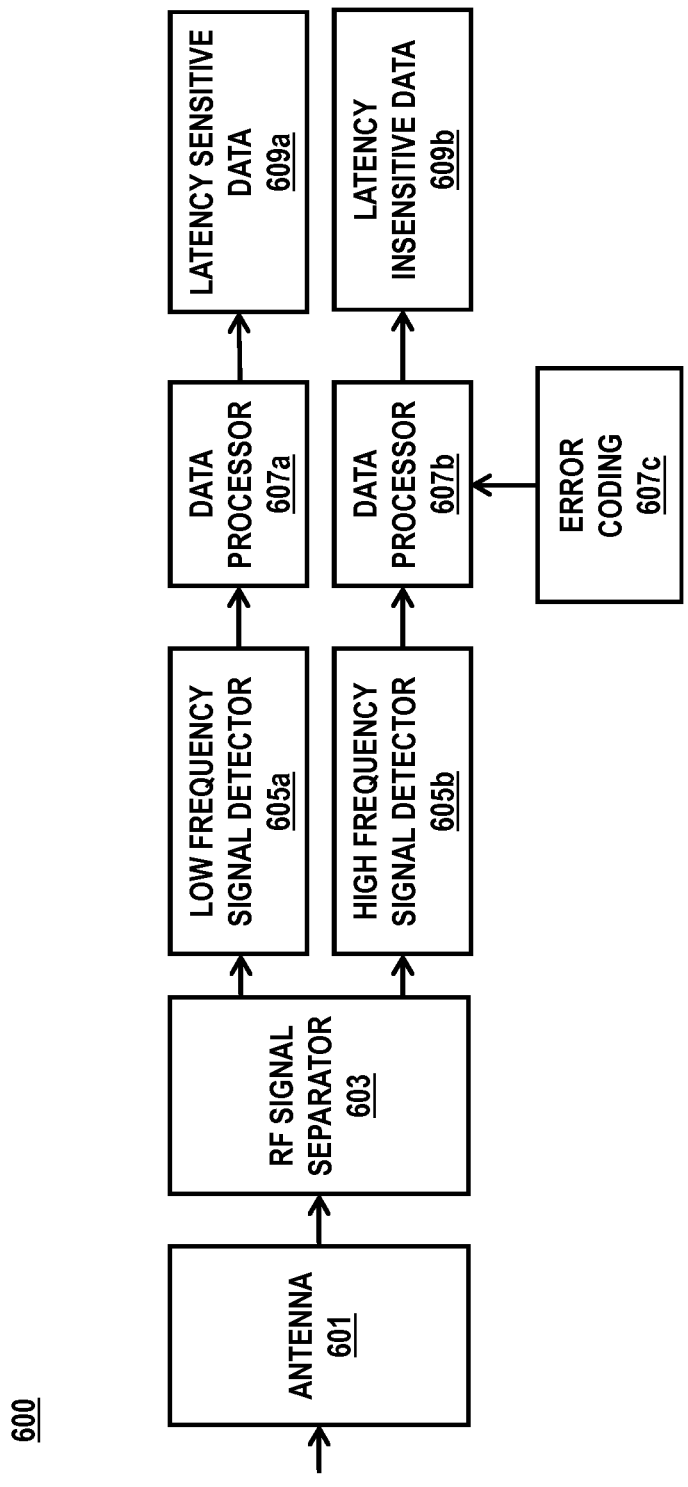
FIG. 6 is a diagram of a receiver chain, according to an exemplary embodiment.

FIG. 6 is a diagram of a receiver chain, according to an exemplary embodiment. Terminal receiver 600 may comprise one or more components configured to reconstruct the data that was transmitted by transmitter 400 of FIG. 4. In one embodiment, terminal receiver 600 includes antenna 601, RF signal separator 603, low frequency signal detector 605a, high frequency signal detector 605b, data processors 607a and 607b (also collectively data processors 607), error coding module 607c, and buffers 609a and 609b for latency sensitive data and latency insensitive data, respectively. While specific reference will be made to this particular embodiment, it is also contemplated that terminal receiver 600 may embody many forms and include multiple and/or alternative components.

Figure 7:
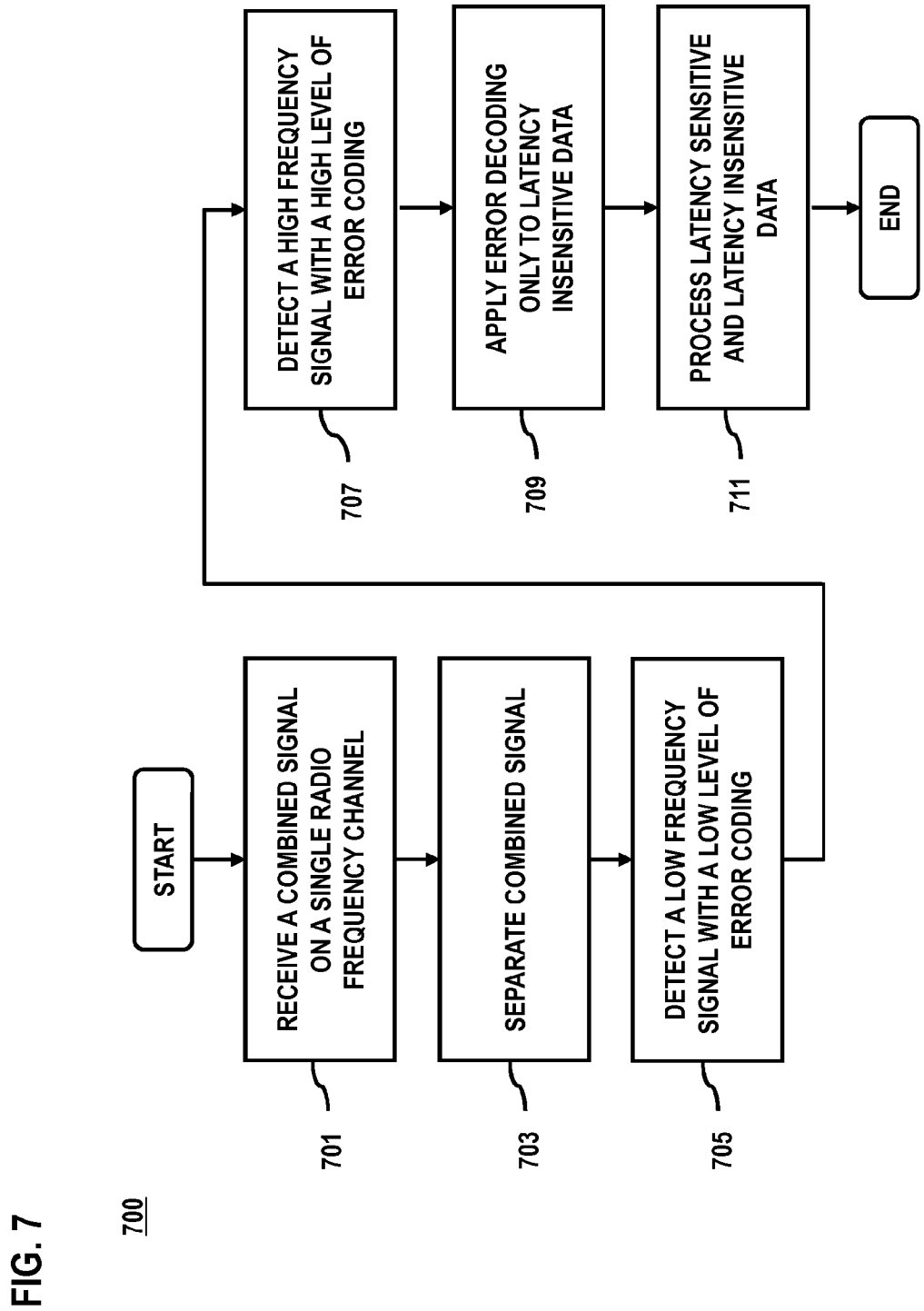
FIG. 7 is a flowchart of a process for receiving signals in a low latency radio frequency wave transmission system, according to an exemplary embodiment.

The operation of receiver 600 is described with respect to FIG. 7. The terminal receiver 600 receives RF signals via antenna 601 (per step 701). Specifically, antenna 601 facilitates receiving transmission of the combined signal output from transmitter 400. It is contemplated that received signal may have been sent from various devices including, for example, signal regenerators 203a-203n, and terminal transmitter 201.

Additionally, according to one embodiment, the terminal receiver 400 may include an RF signal separator 603. The radio frequency signal separator 603 may separate, as in step 703, the combined signal into the component signals corresponding to latency sensitive data and latency insensitive data, respectively. According to exemplary embodiments, the low frequency signal detector 605a detects the appropriate signal (step 705) to derive the latency sensitive data. The low frequency signal as a low level of error coding. Process 700 pertains to the treatment of different levels of error coding. By way of example, a "low" level of error coding can include the non-use of error coding, whereas "high" level of error coding is relative to the low level as to pertain some perceived differences in latency. Similarly, the high frequency signal detector 605b detects the high frequency signal that represents the latency insensitive data (step 707).

According to one embodiment, the terminal receiver 205 may include one more data processors 607. Under this scenario, the data processor 607a extracts the data detected by the low frequency signal detector 605a to output the latency sensitive data into buffer 609a. Likewise, the data processor 607b receives RF signal from detector 605b and outputs latency insensitive data to buffer 609b. At this point, if the receiver 600 is deployed only within the transport network (e.g., network 103 of FIG. 1), the latency sensitive data and the latency insensitive data may be forwarded to the destination network 101b. In step 709, error decoding is applied only to the latency insensitive data. Thereafter, all the data is processed, which may include transmission to a destination node or network.

Figure 8:
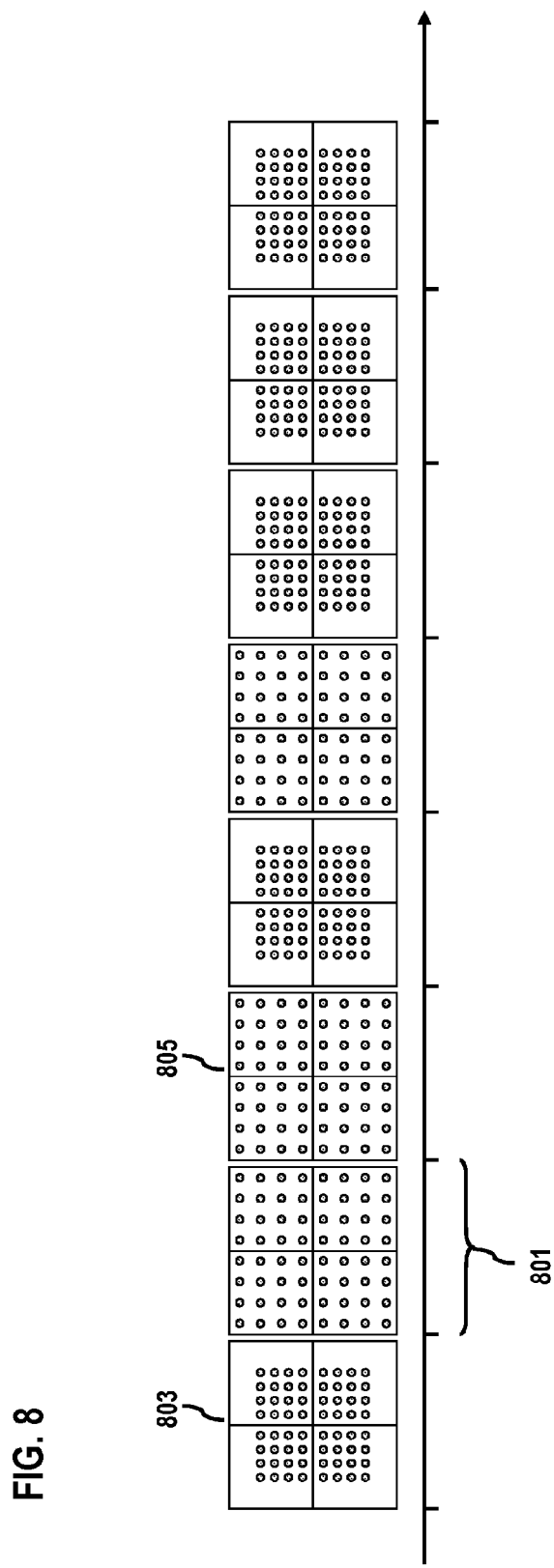
FIG. 8 is a diagram of signal intensity along time for an RF signal providing low latency transmission, according to an exemplary embodiment.

FIG. 8 is a diagram of signal intensity along time for an RF signal providing low latency transmission, according to an exemplary embodiment. As explained above, low latency transmission can be achieved using two separate signals that are error coded and modulated differently based on the sensitivity of the data to latency. Notably, a first signal using a first modulation scheme may be combined with a second signal using a second modulation scheme to enable control of the spectral efficiency of a single radio frequency channel. In this manner, the single radio frequency channel can employ multiple modulation schemes with different latency and spectral efficiency characteristics.

In one embodiment a combined signal on the single radio frequency channel includes a high frequency high latency RF signal and a low frequency low latency RF signal. The high frequency signal can modulated using a high order modulation scheme (e.g., 64-QAM). The low frequency signal can be modulated using a 50% binary amplitude modulation. The modulation level of the low frequency signal provides for the use of a lower level of error coding than the high frequency signal. Consequently, spectral efficiency of the single radio frequency channel may be maintained.

The diagram shows the signal intensity of the QAM radio frequency signal against a time line. For example, the time intervals may be one microsecond to correspond to a symbol rate of one MBaud. The diagram shows low signal intensity 803, and high signal intensity 805. Such variation in the modulation schemes itself can convey bit information.

In one embodiment, transport network 103 of FIG. 1 may be configured to detect low signal intensity 803 and high signal intensity 805 to enable the combining of a low frequency signal representing latency sensitive information with a high frequency signal representing latency insensitive information. For example, low signal intensity 803 may correspond to a low binary digit value and high signal intensity 805 may correspond to a high binary digit value. In one embodiment, data transfer using signal intensity represents latency sensitive information and the data transferred using the QAM signal represents latency insensitive information. It is noted that a first level of coding (including no error coding) may be performed on the signal representing the latency sensitive information and a second level of error coding may be used on the signal representing latency insensitive information.

Turning now to the process of regeneration of the signals over the transport network 103 (as described in FIG. 9), the repeater or regenerator resembles that of transmitter 400 of FIG. 4.

Figure 9:
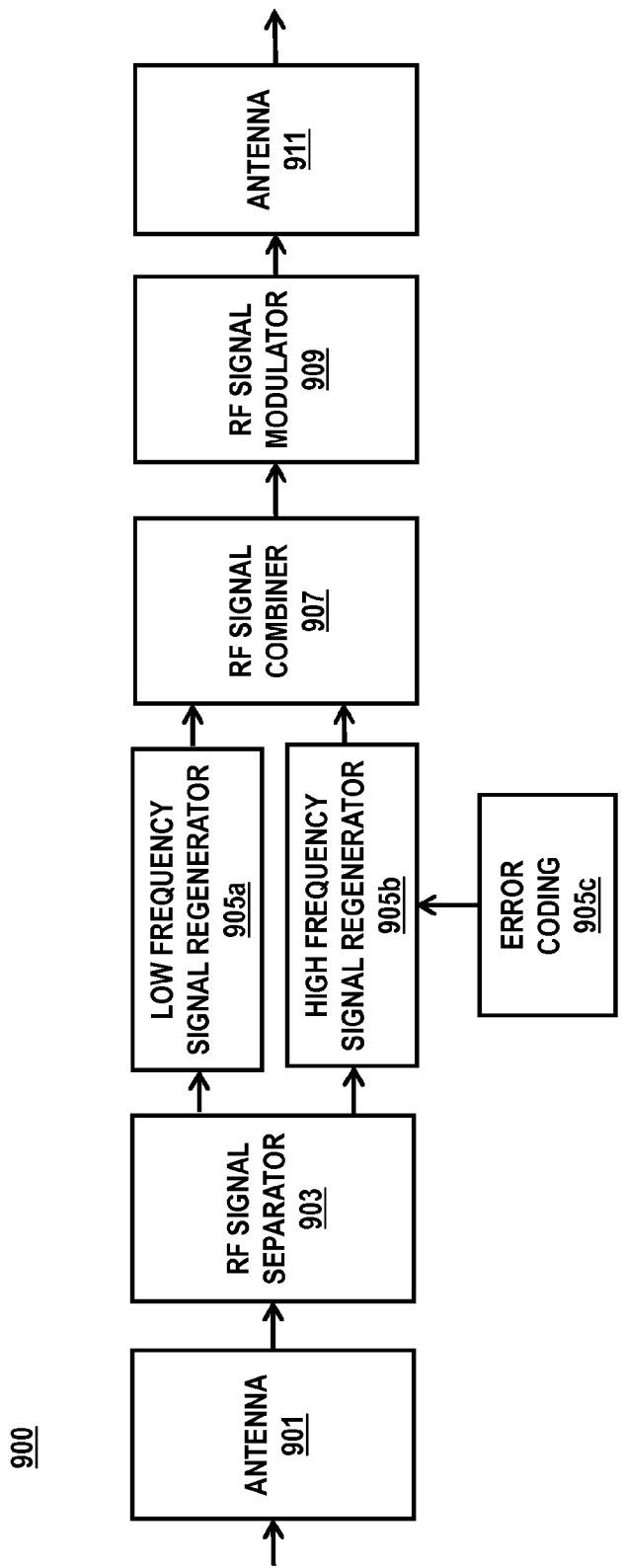
FIG. 9 is a diagram of a signal regenerator, according to an exemplary embodiment.
Figure 10:
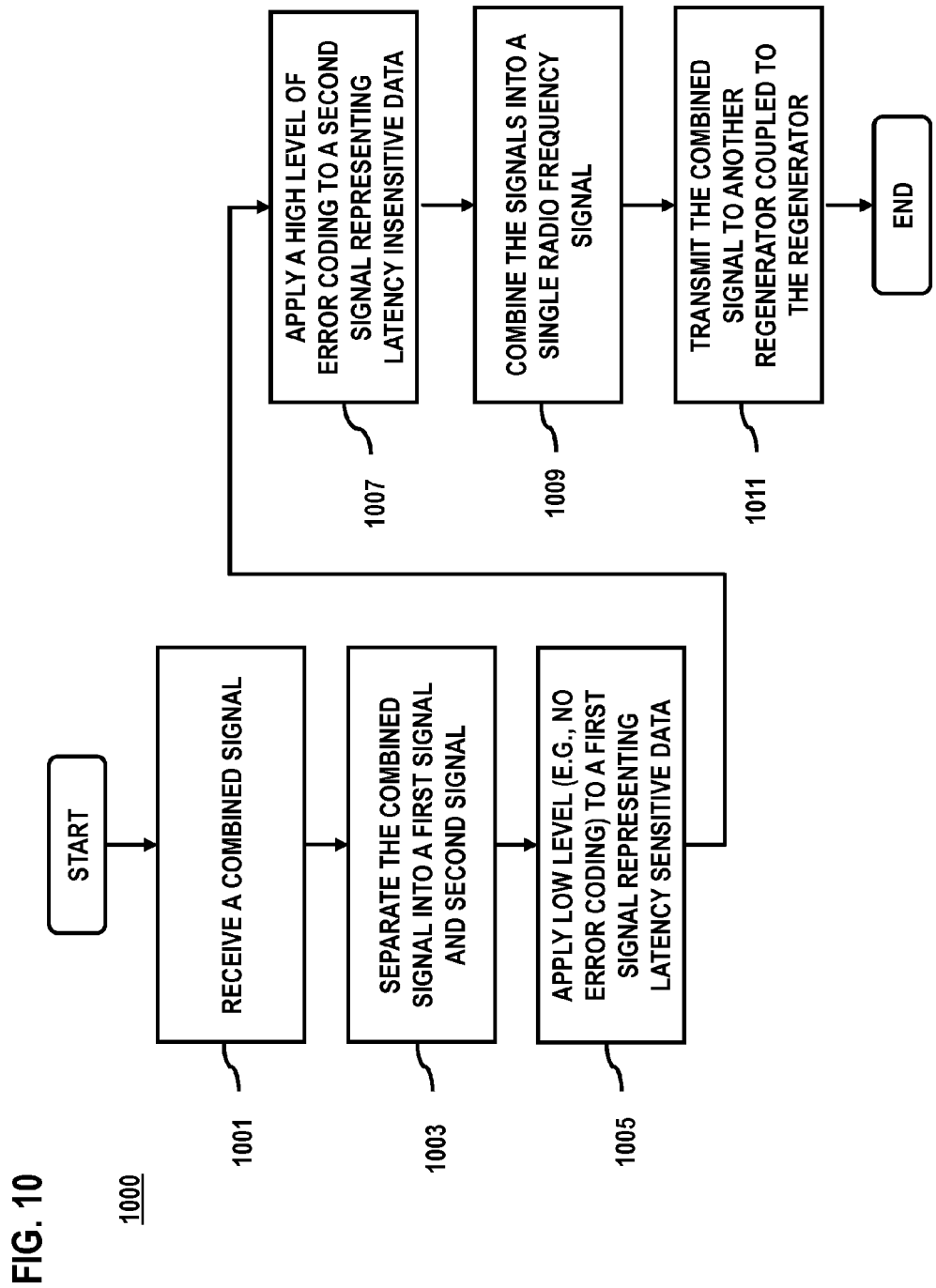
FIG. 10 is a flowchart of a process for signal regeneration in a low latency radio frequency wave transmission system, according to an exemplary embodiment.

FIG. 9 is a diagram of a signal regenerator, according to an exemplary embodiment. Signal regenerator 203 may comprise one or more components configured to execute the process 1000 of FIG. 10. In one embodiment, signal regenerator 900 (which can be deployed in the system of FIG. 2; namely anyone of nodes 203a-203n) includes receive antenna 901, RF signal separator 903, low frequency signal regenerator 905a, high frequency signal regenerator 905b, error coding module 905c, RF signal combiner 907, RF signal modulator 909, and transmit antenna 911. While specific reference will be made to this particular embodiment, it is also contemplated that signal regenerator 203 may embody many forms and include multiple and/or alternative components. The operation of the above components is similar to that of the transmitter 400, with the exception of the use of regenerators 905 for the low frequency and the high frequency signals. In general, regeneration involves reconstructing the received signals from their component parts, as opposed to merely relaying the received signals.

In steps 1001 and 1003, the combined signal is received and separated into a first signal (e.g., low frequency signal) and a second signal (e.g., high frequency signal). Because this low frequency signal is associated with a low level of error coding (e.g., no error coding is used), it is processed differently than the high frequency signal with a high level of error coding.

Accordingly, in one embodiment, the low frequency signal regenerator 905a performs little or no error coding (step 1005). Additionally, or alternatively, the high frequency signal regenerator 905b may perform error coding at a different level (e.g., will utilize some error coding), per step 1007.

In step 1009, the signal regenerator 900 utilizes combiner 907 to mix the low frequency signal regenerated by the low frequency signal regenerator 905a and the high frequency signal regenerated by the high frequency signal regenerator 905b to yield a single RF signal, which is then sent along the transport 103 (per step 1011).

In one use case, the transport network of FIG. 2 can be used to carry traffic between two cities, e.g., Chicago and New York. In this example, the shortest physical distance is approximately 846 miles or 1,361 km. The transport network 103 can employ a combination of 27 signal regenerators (e.g., signal regenerator 203a-203n) to cover a maximum span of 50 km and ends at terminal receiver 205. It is estimated that the removal of overhead reduces the latency added by each signal regenerator (e.g., signal regenerator 203) from 0.2 ms to 0.005 ms. This reduction results in the round trip transport latency being reduced from 20.3 ms to 9.2 ms. Such performance surpasses even that experienced by fiber optic systems (e.g., 13.33 ms).

In the various embodiments, a single RF channel contains both low latency and high latency signals, whereby the spectral efficiency of the overall signal is high, as to satisfy many industry and governmental requirements. The low latency portion of the signal serves latency sensitive services, while the high latency portion of the signal serves latency non-sensitive services. This segregation of services enables service providers to address different needs of customers/subscribers.

The processes described herein for detecting and/or segregating traffic into latency sensitive data or latency insensitive data to produce a common RF signal may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
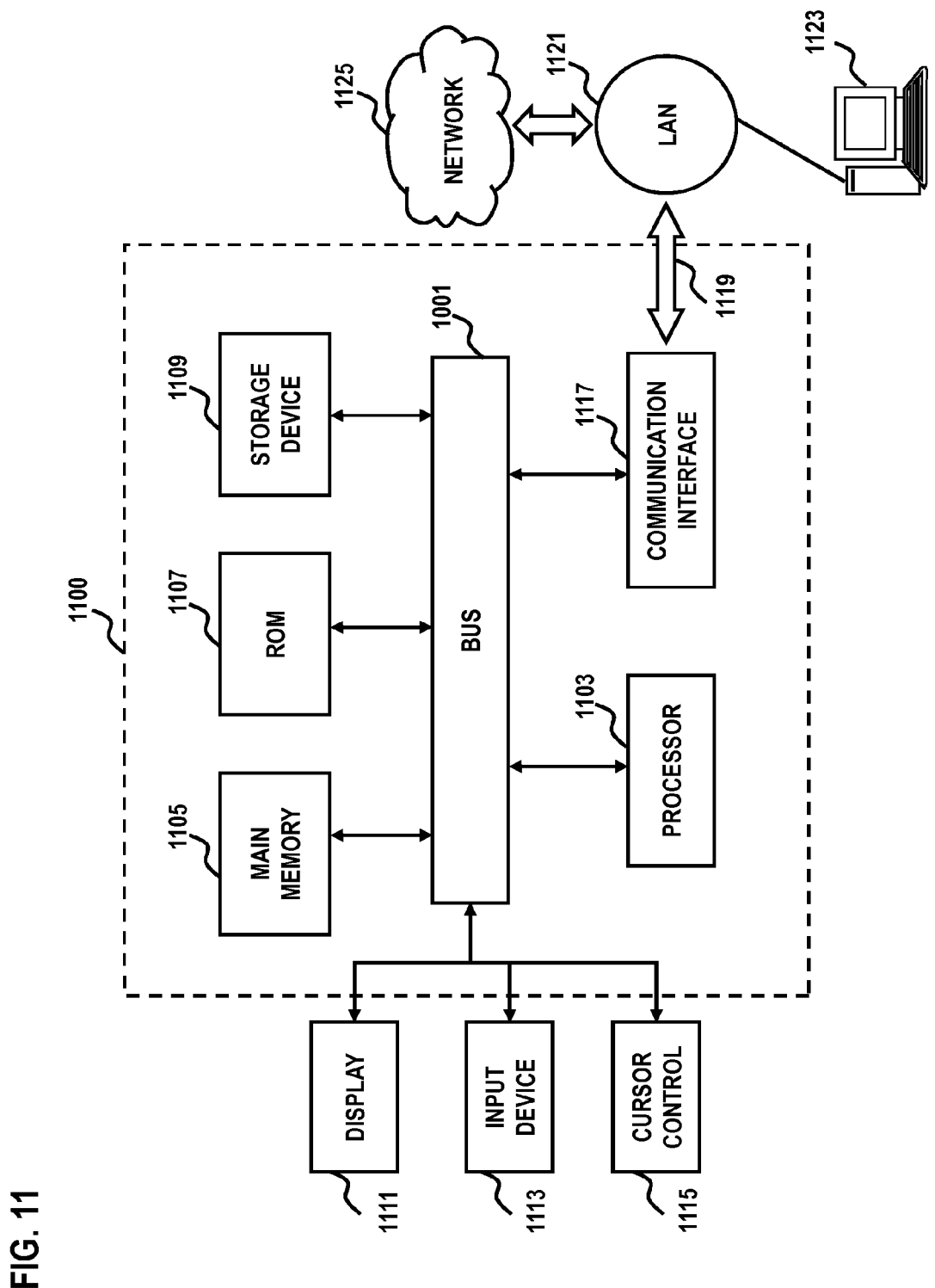
FIG. 11 is a diagram of a computer system that can be used to implement various exemplary embodiments.

FIG. 11 illustrates computing hardware (e.g., computer system) 1100 upon which exemplary embodiments can be implemented. The computer system 1100 includes a bus 1101 or other communication mechanism for communicating information and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a touch screen or a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an exemplary embodiment, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement exemplary embodiments. Thus, exemplary embodiments are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g., for Ethernet™ or an Asynchronous Transfer Model (ATM) network) to provide a data communication connection to a compatible LAN. Wireless links can also be implemented. In any such embodiment, communication interface 1117 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g., a wide area network (WAN) or the global packet data communication network now commonly referred to as the "Internet") or to data equipment operated by a service provider. The local network 1021 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an exemplary embodiment through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
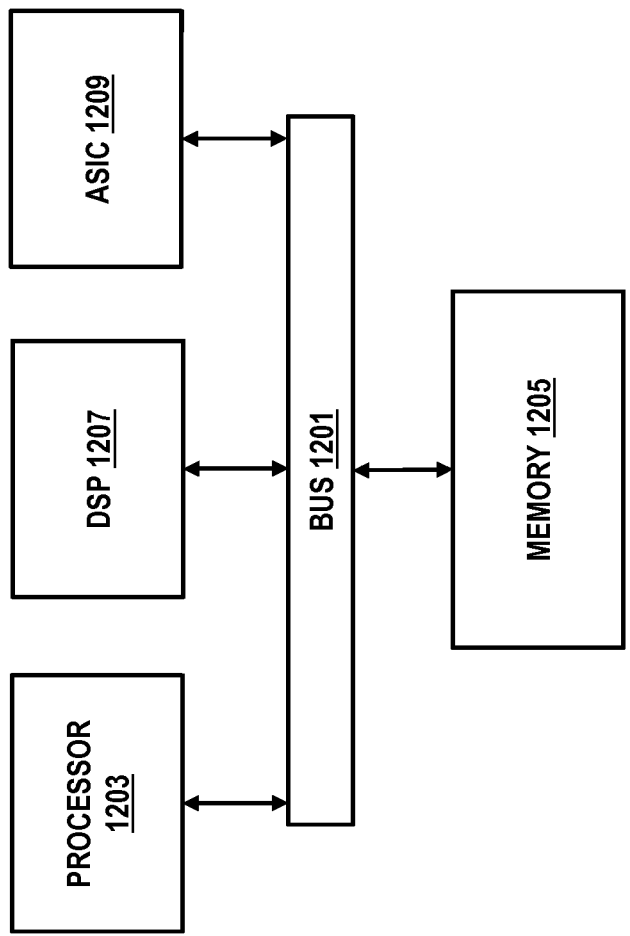
FIG. 12 is a diagram of a chip set that can be used to implement an embodiment of the invention.

FIG. 12 illustrates a chip set or chip 1200 upon which an embodiment of the invention may be implemented. Chip set 1200 is programmed to enable the functionality of long haul transport network 103 as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of enabling the functionality of long haul transport network 103.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to enable virtual throwing of objects. The memory 1205 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a first signal representing latency sensitive data;
   receiving a second signal representing latency insensitive data; combining the first signal and the second signal to output a combined radio frequency signal, wherein the latency sensitive data of the combined radio frequency signal are at a first level of error coding, and the latency insensitive data of the combined radio frequency signal are at a second level of error coding; and regenerating the first signal without error coding and the second signal with error coding.

2. A method according to claim 1, further comprising:
segregating data traffic into the latency sensitive data or the latency insensitive data.

3. A method according to claim 1, wherein the first signal has a frequency that is lower than the second signal, and the first level of error coding includes no use of error coding.

4. A method according to claim 1, wherein the combined radio frequency signal represents a single radio frequency channel.

5. A transmitter apparatus comprising:
a combiner configured to combine a first signal representing latency sensitive data and a second signal representing latency insensitive data to output a combined radio frequency signal,
wherein the latency sensitive data of the combined radio frequency signal are at a first level of error coding, and the latency insensitive data of the combined radio frequency signal are at a second level of error coding; and
wherein the combined radio frequency signal is transmitted to regenerate the first signal without error coding and the second signal with error coding.

6. A transmitter apparatus according to claim 5, further comprising:
circuitry configured to segregate data traffic into the latency sensitive data or the latency insensitive data.

7. A transmitter apparatus according to claim 5, wherein the first signal has a frequency that is lower than the second signal, and the first level of error coding includes no use of error coding.

8. A transmitter apparatus according to claim 5, wherein the combined radio frequency signal represents a single radio frequency channel.

9. A method comprising:
receiving a combined radio frequency signal that includes a first signal representing latency sensitive data and a second signal representing latency insensitive data, wherein the latency sensitive data of the combined radio frequency signal are at a first level of error coding, and the latency insensitive data of the combined radio frequency signal are at a second level of error coding, and wherein the combined radio frequency signal was regenerated prior to the reception, the first signal being regenerated without error coding and the second signal with error coding.

10. A method according to claim 9, further comprising:
separating the combined radio frequency signal into the first signal corresponding to the latency sensitive data and the second signal corresponding to the latency insensitive data.

11. A method according to claim 9, wherein the first signal has a frequency that is lower than the second signal.

12. A method according to claim 9, wherein the combined radio frequency signal represents a single radio frequency channel.

13. A receiver apparatus comprising:
a signal separator configured to receive a combined radio frequency signal that includes a first signal representing latency sensitive data and a second signal representing latency insensitive data,
wherein the latency sensitive data of the combined radio frequency signal are at a first level of error coding, and the latency insensitive data of the combined radio frequency signal are at a second level of error coding, and
wherein the combined radio frequency signal was regenerated prior to the reception, the first signal being regenerated without error coding and the second signal with error coding.

14. A receiver apparatus according to claim 13, wherein the signal separator is further configured to separate the combined radio frequency signal into the first signal corresponding to the latency sensitive data and the second signal corresponding to the latency insensitive data.

15. A receiver apparatus according to claim 13, wherein the first signal has a frequency that is lower than the second signal.

16. A receiver apparatus according to claim 13, wherein the combined radio frequency signal represents a single radio frequency channel.

17. A system comprising:
a regenerator configured to receive a combined radio frequency signal that includes a first signal representing latency sensitive data and a second signal representing latency insensitive data, and to regenerate the combined radio frequency signal, the first signal being regenerated without error coding and the second signal with error coding,
wherein the regenerator is further configured to apply a first level of error coding to the latency sensitive data, and to apply a second level of error coding to the latency insensitive data.

18. A system according to claim 17, further comprising:
another regenerator coupled to the regenerator and configured to subsequently regenerate the combined radio frequency signal,
wherein the first level of error coding includes no use of error coding.

* * * * *